Patented Feb. 19, 1929.

1,702,766

UNITED STATES PATENT OFFICE.

HENRY L. COLES AND JOSEPH G. DONALDSON, OF HAMILTON, OHIO, ASSIGNORS TO GUARDIAN METALS COMPANY, OF HAMILTON, OHIO, A CORPORATION OF DELAWARE.

COMPOSITE METAL PLATE.

No Drawing. Original application filed August 5, 1924, Serial No. 730,194. Divided and this application filed February 4, 1926. Serial No. 86,034.

The object of our invention is to produce a composite plate or mass including a metallic alloy which shall be capable of resisting melting or oxidation, as by the local application of high heat by means of the blow pipe or other device, also which shall be capable of resisting disruption by explosives and cutting by drills or other tools.

In carrying out our invention we employ, primarily, what we shall term herein a "major high melting point metal," meaning by this term that the principal constituent of the alloy consists of a metal or combination of metals having a melting point above 2200° C. Illustrations of such a metal or metals are tungsten, molybdenum, uranium, etc. In fact it is intended to cover by the above term all metals of high melting point included within Group 6 of Mendelejeff's Periodic Table, and for the purposes of this invention the major metal may consist of one of these, as, for instance, tungsten, or two, as for instance tungsten and molybdenum as desired. With this major metal we combine a smaller percentage (preferably from 10% to 25% of the resulting alloy) of another metal, such as nickel. It is essential that the alloy contain carbon or carbides, and these may be absorbed from the hearth or may be added in the form of the carbides of the metals employed, or may be directly added to the mixture during the melting process. Such carbon may be added in varying proportions, care being taken, however, that the metals be not saturated therewith and thus converted entirely into carbide, our purpose being to mix a metal with its metallic carbide and not to use the carbide of a metal alone. From 2% to 5% of carbon has been found to give satisfactory results.

To a metallic alloy having the constituents above stated we may, if desired, add copper in any suitable proportion, preferably in the form of copper sulphide or cupro-silcon. Again, if desired, the metallic alloy, as above stated, may be used as a core, molten copper or other metal being cast about it, in which case over the areas of contact between casing and core an alloying action will take place, producing at such points material of very high melting point, practically burn-resisting and drill-resisting, and possessing an added advantage residing in the high heat conductivity of the encompassing copper.

In practicing our process the electric furnace may advantageously be employed, in which the major metal may be melted and the other constituents added after the same has become molten. We employ the oxide of one of the metals (for example, tungsten), together with the sulphide of the other metal (for example, nickel). If desired carbon may be added to hasten the reduction, although not essential. If desired, either the oxide or the sulphide may be present in excess in order that the reaction may be carried to completion. For the purpose of illustration, where but a single major high melting point metal is employed, the following charge may be used:—

700 lbs. tungsten concentrates (approximately 66% $WO_3$).
100 lbs. nickel sulphide.
60 lbs. calcium sulphate ($CaSO_4$).
20 lbs. calcium fluoride ($CaF_2$).

A typical charge for an alloy using two major high melting point metals is as follows:—

600 lbs. tungsten concentrates (approximately 66% $WO_3$).
400 lbs. molybdenite (approximately 85% $MoS_2$).
100 lbs. nickel sulphide (NiS).
60 lbs. calcium sulphate ($CaSO_4$).
20 lbs. calcium fluoride ($CaF_2$).

The carbon may be added directly to the charge or may be absorbed from the hearth or from the drippings of the electrodes in case carbon is desired. If added directly to the charge it is preferable to introduce the nickel in metallic form toward the end of the reaction, the quantum of nickel introduced amounting to approximately 4% to 8% of the completed alloy. Also, if desired, copper sulphide may be added during the reaction. It may also be noted that in place of the tungsten concentrates we may use Scheelite.

The purpose of the calcium sulphate and the calcium fluoride is to provide a flux which will prevent the escape of the sulphur until the reaction has been completed; also to provide a fluid and volatile flux which will pass off when the temperature is raised at the end of the reaction. Such reaction, which begins to take place between 1300 and 1400° C., is as follows:—

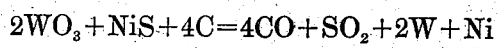
$$2WO_3 + NiS + 4C = 4CO + SO_2 + 2W + Ni$$

The calcium sulphate and the calcium fluoride form a fluid slag which will not only, as above stated, prevent the escape of the sulphur in order that the reaction may continue, but which also will not absorb sulphur at the beginning of the reaction. As the temperature rises the calcium sulphate begins to dissociate into calcium oxide (CaO) and sulphur tri-oxide ($SO_3$). The calcium oxide together with the calcium fluoride (which acts to lower the melting point of the slag) form a basic slag which is highly effective in absorbing sulphur from the alloy when formed at the end of the reaction. Such slag possesses therefore the three advantageous qualities found desirable in the production of a proper yield of metal, as heretofore generally indicated, i. e., fluidity, non-absorptiveness of sulphur at the beginning of the reaction and capacity for volatilizing at the close of the reaction, the remaining portion forming a basic slag to assist in purifying the alloy of sulphur found therein. We may add that with slags differently constituted the metal would, on occasion, be found mixed therewith, offering difficulty in subsequent separation; also by the use of the slag herein described the maximum yield of clear metal is obtained.

Good results may be produced by a modificaton of the second typical charge specified above, i. e., the substitution of copper sulphide for molybdenite. Or, if desired, either retaining or omitting the molybdenite, copper may be added directly to the mixture at the end of the melt, or, as previously set forth, the alloy may be used as a core, an encasing mass of metal being cast about it, in which case further alloying will take place at the areas of contact.

A metal alloy produced as above indicated will resist melting by the application of high heat as by means of a blow torch; also cutting as by means of oxygen. If found somewhat lacking in ductility a composite mass of metal may be made up employing such an alloy as laminae separated by other (and more ductile) metals, and preferably welded thereto or alloyed therewith. The capacity for resisting the application of high heat permits the use of the alloy in very thin strata, and such resistance is increased where the alloy is encased in another metal due to the heat-conductivity of the latter, which permits the heat from the torch to be dissipated.

Thus, one or more plates made up of the alloy herein described and arranged either in alignment or in staggered relation and either in contact, or partial contact, with each other or separated to any desired extent and by any suitable means may, as by casting, be embedded in encompassing metal, such as iron or steel, to form a composite mass suitable for use, for example, in the construction of safe, and vault doors, vault linings, etc. If desired, the encompassing metal may be of copper, either in whole or in part, such material having high heat-conductivity. It will be understood that under attack, as by an oxy-acetylene torch, the encompassing metal acts as a first line of defense, resisting, by reason of its high heat-conductivity, the localizing and consequent destructive effect of the application of the heat of the torch. If, however, as a result of applying sufficient energy and for a sufficient length of time, the encompassing mass is penetrated, the torch next encounters the layer or layers of the alloy above described, which, certainly under conditions ordinarily obtaining, blocks further progress toward penetration of the plate or mass as a whole.

What we claim is:—

1. A metallic plate comprising an alloy having incorporated therein upwards of 70% tungsten, substantially 10% nickel, and substantially 14% copper; and a metal of high heat conductivity substantially encompassing said alloy and being united thereto as by alloying therewith.

2. A metallic plate comprising an alloy having incorporated therein upwards of 70% tungsten, 4 to 10% nickel, and 2 to 14% copper; and a metal of high heat conductivity substantially encompassing said alloy and being united thereto as by alloying therewith.

3. A metallic plate comprising an alloy having incorporated therein upwards of 70% tungsten, substantially 10% nickel, substantially 14% copper, and substantially 4% carbon; and a metal of high heat conductivity substantially encompassing said allow and being united thereto as by alloying therewith.

4. A metallic plate comprising an alloy having incorporated therein upwards of 70% tungsten, 4 to 10% nickel, 2 to 14% copper, and 1 to 4% carbon; and a metal of high heat conductivity substantially encompassing said alloy and being united thereto as by alloying therewith.

5. A metallic plate comprising an alloy having incorporated therein upwards of 70% tungsten, 4 to 10% nickel, 2 to 14% copper, and 1 to 4% carbon; and cast iron substantially encompassing said alloy and being united thereto to form a composite mass.

This specification signed this 27 day of January, 1926.

JOSEPH G. DONALDSON.
HENRY L. COLES.